(12) United States Patent
Schulz et al.

(10) Patent No.: US 8,760,087 B2
(45) Date of Patent: Jun. 24, 2014

(54) ENERGY-EFFICIENT ACTUATOR SYSTEM

(75) Inventors: Alexander Schulz, Vienna (AT); Michael Wehse, Puch (AT); Johann Wassermann, Vienna (AT); Manfred Neumann, Vienna (AT)

(73) Assignee: Technische Universitat Wien, Vienna (AT)

( * ) Notice: Subject to any disclaimer, the term of this patent is extended or adjusted under 35 U.S.C. 154(b) by 237 days.

(21) Appl. No.: 13/266,036

(22) PCT Filed: Apr. 23, 2010

(86) PCT No.: PCT/AT2010/000126
§ 371 (c)(1),
(2), (4) Date: Oct. 24, 2011

(87) PCT Pub. No.: WO2010/121284
PCT Pub. Date: Oct. 28, 2010

(65) Prior Publication Data
US 2012/0038294 A1    Feb. 16, 2012

(30) Foreign Application Priority Data
Apr. 24, 2009 (AT) .................... A 631/2009

(51) Int. Cl.
*H02P 5/00* (2006.01)
*H02P 5/46* (2006.01)

(52) U.S. Cl.
USPC ............ 318/8; 318/135; 318/560; 318/571; 318/400.29

(58) Field of Classification Search
USPC ........ 318/8, 430, 560, 561, 571, 572, 400.29, 318/135; 323/268; 310/90.5; 34/493
See application file for complete search history.

(56) References Cited

U.S. PATENT DOCUMENTS

| | | | |
|---|---|---|---|
| 5,543,673 A | 8/1996 | Katsumata et al. | 310/90.5 |
| 5,712,636 A * | 1/1998 | Buch | 341/152 |
| 5,801,508 A * | 9/1998 | Obayashi | 318/801 |
| 6,486,643 B2 * | 11/2002 | Liu | 323/268 |
| 6,922,299 B2 * | 7/2005 | Sakamoto | 360/69 |
| 7,863,841 B2 * | 1/2011 | Menegoli et al. | 318/400.29 |
| 8,181,358 B2 * | 5/2012 | Isono | 34/493 |
| 2002/0089316 A1* | 7/2002 | Liu | 323/268 |
| 2003/0174428 A1* | 9/2003 | Sakamoto | 360/70 |
| 2005/0061920 A1* | 3/2005 | Brault et al. | 244/165 |
| 2005/0179333 A1* | 8/2005 | Kawashima | 310/90.5 |

(Continued)

FOREIGN PATENT DOCUMENTS

| | | |
|---|---|---|
| DE | 10 2006 029 514 | 5/2007 |
| EP | 1 460 293 | 9/2004 |
| EP | 1 630 938 | 3/2006 |
| JP | 2002 257136 | 9/2002 |

OTHER PUBLICATIONS

Betschon, "Design principles of integrated magnetic bearings," Dissertation, ETH Zurich, 2000.

(Continued)

*Primary Examiner* — Paul Ip
(74) *Attorney, Agent, or Firm* — Fulbright & Jaworski LLP

(57) ABSTRACT

What is described is an actuator system (2) comprising at least one actuator (29, 29') and an associated control system (8) which is designed for at least two operating modes, at least one of which may be deactivated, whereby one of the operating modes is a high efficiency operating mode.

15 Claims, 15 Drawing Sheets

(56) References Cited

U.S. PATENT DOCUMENTS

| | | | |
|---|---|---|---|
| 2005/0206351 A1* | 9/2005 | Wingett et al. | 322/44 |
| 2007/0056185 A1* | 3/2007 | Isono | 34/493 |
| 2008/0310046 A1* | 12/2008 | Menegoli et al. | 360/75 |

OTHER PUBLICATIONS

Ertl et al., "A new 1kW class-D supported linear power amplifier employing a self-adjusting ripple cancellation scheme," Proceedings of the 29th Int.Conf.on Power Conversion and Intelligent Motion, 265-274, 1996.

Herzog et al, "Unbalance compensation using generalized notch filters in the multivariable feedback of magnetic bearings," *IEEE Transactions on Control Systems Technology*, 4(5): 580-586, 1996.

International Search Report issued in PCT/AT2010/000126, dated Jul. 1, 2010.

Jia and Zhu, "Research of digital control system for single freedom hybrid magnetic bearing in the axial direction," *Proceedings of the Eighth International Conference on Electrical Machines and Systems*, 2005.

Knospe, "Reducing unbalance response with magnetic bearings," *Int. Rep. Center for Magnetic Bearings*, University of Virgina, VA, 1992.

Wassermann and Springer, "A linear power amplier with current injection (LACI) for magnetic bearings" In *Proceedings of the Fourth International Symposium on Magnetic Bearings*, 1994.

* cited by examiner

ENERGY-EFFICIENT ACTUATOR SYSTEM

This application is a national phase application under 35 U.S.C. §371 of International Application No. PCT/AT2010/000126 filed 23 Apr. 2010, which claims priority to Austrian Application No. A 631/2009 filed 24 Apr. 2009. The entire text of each of the above-referenced disclosures is specifically incorporated herein by reference without disclaimer.

The present invention relates to an actuator system comprising at least one actuator and an associated control system, which is designed for at least two operating modes, at least one of which can be deactivated, according to the preamble of claim 1.

In general and here, too, an "actuator" is understood to be an energy converter with pertinent energy adjuster (typically an amplifier) that converts a command variable typically supplied by a control or regulation system into a control variable, for example, for a mechanical system. Normally, this requires an auxiliary energy which is to be supplied to the actuator as well.

"Intelligent actuator" is understood to be a closed system which predetermines the required control signal with a defined precision in consideration of any interferences. Intelligent actuators enable a controlled or regulated operation. In addition to the actuation task, diagnostics functions for self-monitoring are integrated.

In various technical areas (e.g. in the fields of manufacture or transportation) actuators are used e.g. for the application of force (transport or mixing of substances, structural support or positioning, etc.) or for vibration dampening (e.g. as a substitute for conventional squeeze film dampers in the vibration reduction of turbine rotors).

In general, actuators are used in virtually all technical fields such as mechanical engineering, process engineering or medical engineering. Actuators may for example be classified according to the operating principles; see electromagnetic actuators, piezoelectric actuators, electro- or magneto-restrictive actuators, pneumatic, hydraulic actuators, etc.

FIG. 1 schematically shows for illustration by way of example an actuator 2 embedded in a mechatronic system 1 (however, also several actuators 2 may be provided). Via a connection 3 the actuator 2 provides a control variable to e.g. a mechanical basic system 4, upon which further, at 5, mechanical, electrical and/or chemical variables as well as, at 6, external disturbance variables may act. The reactions indicated with an output 7 are detected in a control or regulating chain 8 by one or several sensors 9, which generally comprise transducers or transformers 10, measuring amplifiers 11 and a signal processing unit 12. Corresponding sensor or measuring signals are fed to a control or regulating system 14 via a connection 13, which also comprises an input 15 for the set value selection. This control or regulating system 14 delivers at 16 a command (reference) value to the actuator 2, which comprises a signal processing unit 17, an energy adjuster 18 and an energy converter and/or energy transformer 19, with energy being supplied to the actuator 2 at 20.

A specific design of an electromagnetic actuator is e.g. an active magnetic bearing that serves the contactless support of structures, e.g. of a rotating shaft.

From EP 1 460 293 A2 there is known e.g. an actuator, as given above, in the form of a magnetic bearing which is to be used for motor/pump systems, in particular for gas extraction in the manufacture of semiconductors. To reduce disadvantageous vibrations because of noise, two modes of operation are provided for the magnetic bearing, i.e. a high performance mode and a low-power mode. Specifically, a switch system is allocated to each winding in order to connect a voltage source with high voltage or a voltage source with low voltage to the winding of the magnetic bearing depending on the power requirements. Switching is effected in dependence on the detected current changing speed.

DE 10 2006 029 514 B3 further describes the control of an actuator in a motor vehicle, wherein also two modes of operation are provided, that is a mode of operation for normal operation and a second mode of operation which is of importance when other components such as a micro-controller are not in a normal mode of operation controlling the actuator, but for example carry out a self-test.

The two above cited systems do not mention a reduction in energy consumption.

An active magnetic bearing for the radial support of a rotating shaft typically comprises a controller, sensors for determining the distance of the structure to be supported from a reference position, power amplifiers, current sensors and a bearing magnet consisting of a ferromagnetic stator element in a bearing housing with coils that are mounted on pole legs and a ferromagnetic rotor element that is mounted on the shaft. The stator element and the rotor element are preferably each made of individual thin ferromagnetic metal sheets each for the reduction of eddy currents, similar to the manufacture of an electric motor. The metal sheets of the rotor element are designed circularly with a web thickness that is required for the necessary magnetic flow, predetermined by the desired bearing loads. The stator element of the bearing magnet likewise mainly consists of punched, circular individual metal sheets with inwardly directed, pronounced pole legs which are kept together by means of a clamping device. Coils are located on the individuals pole legs, by which forces are applied on the rotor part with the help of electric current, according to the principle of lifting magnets. This enables contactless support of the structure, in this example, of a rotor.

Instead of the bearing friction which is present in conventional bearings, in a magnetic bearing there occurs a brake torque because of cyclic magnetization losses composed of hysteresis losses and eddy current losses. A control of the electromagnets by means of switching amplifiers enables energy stored in the inductances to be re-supplied to an intermediate circuit. Only ohmic losses that are proportional to the load current thus occur in the electromagnets, supply lines and plug-in connections.

A reduction in the amount of energy needed for the support is enabled by so-called hybrid magnetic bearings which constitute a combination of permanent magnetic bearings, for the provision of static bearing forces, and active magnetic bearings. Energy is saved in this connection by the coil currents that are considerably lower in static loading condition.

The losses in the switching amplifiers are essentially composed of conduction losses, switching losses and losses of the driver circuits. The conduction losses are proportional to the voltages dropping on the respective power semiconductors conductive in the respective operating state and to the load current. The switching losses are dependent on the load current and directly proportional to the switching frequency and the intermediate circuit voltage.

In known switching amplifier concepts with a directly digital control, the rating of the intermediate circuit voltage as well as of the switching frequency takes place in line with the necessary maximum control dynamics. Under partial load conditions, that is when no full control dynamics of the active magnetic bearing are required, for instance, at a speed lower than the maximum rotor speed, unnecessarily high losses will occur.

In general, it can be said that usually actuators are designed for the worst-case operating state, for example, for a maximum required force, traverse rate, power, dynamics etc. In the partial load range this results in a high energy intrinsic consumption, since the control, the power control and the actuators typically work with constant parameters necessary for the worst case such as sampling rate of the digital control, switching frequency of the power switching amplifiers or power converters (inverters), intermediate circuit voltage etc. For applications with different operating states as well as in all applications such as the active magnetic support of structures, where when passing through critical rotor speeds very high bearing forces are necessary, however, in the majority of operating modes considerably reduced bearing forces are necessary, the result will be an unnecessarily high power loss of the actuator apart from the worst-case operating point. Therefore, it is desirable to enable an essential reduction in the power loss in partial load ranges and thus an ecological and economical solution for the application of actuators by means of a special design of the actuator together with the control.

In addition to the controls based on P(I)D position controllers which have been used for more than 30 years, for a long time now it has been made use of the possibility of selectively modifying the bearing stiffness and damping by means of active magnetic bearings and/or applying forces on a rotor in order to improve the running properties. An essential reduction of the bearing forces and thus of the energy demand needed for support results from the support of the rotor about its main axis of inertia.

Starting from the classical application of notch filters (cf. Knospe, C. R., "Reducing unbalance response with magnetic bearings", Int. Rep., Center for Magnetic Bearings, University of Virginia, Va., 1992), a multitude of adaptive methods for the unbalance compensation have been developed. In Herzog, R., et al. "Unbalance compensation using generalized notch filters in the multivariable feedback of magnetic bearings"; IEEE Transactions on control systems technology, vol. 4, No. 5, September 1996, for example, a concept with "Generalized NotchFilter" is presented, which uses a two-stage modulation method which is adapted to the variable frequency of the unbalance excitation by the introduction of speed-dependent factors. The "Adaptive Vibration Control" (AVC) (see Betschon, F., "Design Principles of Integrated Magnetic Bearings", Dissertation, ETH Zurich, 2000, pp 78-86; 99-102) proposed for the control of hybrid magnetic bearings enables a reduction of the coil currents by up to 90% as against deactivated AVC. This further shows that for an optimum AVC function, the digitalization rate of the sensor signals, the control sampling rate and the switching frequency, as against the rotor speed, is to be selected higher by at least a factor six. It is remarkable that the sum of switching amplifier losses and iron losses of the realized construction during idling already amounts to 92% of the overall energy consumption occurring at a mean rotor speed.

Regarding the power amplifiers used in the prior art, analog amplifiers generally have the disadvantage of having high power losses especially in the partial load range, that for inductive loads no re-feeding of the energy stored in the inductive load to the intermediate circuit is possible, which results in a further increase in the power loss, and that no direct digital control of a digital controller is possible, which requires additional components and possibly results in worse signal quality.

Class-G amplifiers have either different, fixed intermediate circuit voltages, including the disadvantage of a high expenditure and thus high costs for the implementation of the number of intermediate circuit voltage levels normally required, or a variable intermediate circuit voltage, whereby the intermediate circuit voltage level depends on the input signal level, having the disadvantage that the signal increasing speed and thus the dynamics are limited by the slew rate of the intermediate circuit voltage.

This disadvantage also results in the case of switching amplifiers in the form of class-D amplifiers, if these have different, fixed intermediate circuit voltages. In audio amplifiers the volume is controlled by modifying the intermediate circuit voltage, which has the disadvantage that no high control dynamics of the intermediate circuit voltage control are obtainable (which is not aimed though in the application for the volume control).

Further proposed are hybrid amplifiers as a combination of an analog amplifier and a digital amplifier; cf. e.g. ERTL, H., J. KOLAR and F. ZACH, "A New 1 kW Class-D Supported Linear Power Amplifier Employing a Self-Adjusting Ripple Cancellation Scheme", Proc. of the $29^{th}$ International Conference on Power Electronics and Intelligent Motion (PCIM), Nuremberg, Germany, May 21-23, 1996. The basic idea of a hybrid amplifier (class-H amplifier) is that—as shown in FIG. 2—a linear amplifier 21 as "master" gives an output voltage (or output current $I_{linear}$) at an output 22 and a switching amplifier 23 as "slave" supplies the necessary output current $I_{switch}$ for a load 24. On the whole, a current $I_{total}=I_{linear}+I_{switch}$ is supplied to this load 24. Therefore, hybrid amplifiers combine the advantages of low power loss and high output signal quality. The linear amplifier 21 may be regarded as an active filter which compensates the current fluctuation portion ("current ripple") and the modulation noise of the switching amplifier as well as possible. The lack of a possibility for direct control, however, constitutes a disadvantage of the hybrid amplifier.

An alternative concept of a hybrid amplifier is presented in WASSERMANN, J. and SPRINGER, H.: "A Linear Power Amplifier with Current Injection (LACI) for Magnetic Bearings"; in: SCHWEITZER, G., R. SIEGWART and R. HERZOG (editors.): Proc. of Fourth Int. Symp. on Magnetic Bearings, pp 371-376, Zurich, Switzerland, Aug. 23-26, 1994. Int. Center for Magnetic Bearings, Swiss Federal Institute of Technology (ETH) Zurich, Hochschulverlag, ETH Zurich. Here, a logic control, depending on the operating conditions (static, quasi-static or highly dynamic) activates either the analog amplifier portion (with a low intermediate circuit voltage) or the switching amplifier portion (with a high intermediate circuit voltage). This concept enables a high output signal quality for the basic load; whenever high force-increasing speeds are required, however, the signal quality deteriorates due to the automatically switched-on switching amplifier.

Thus, it follows that despite the numerous and most varied proposals in accordance with the prior art to obtain actuator systems with lower power loss there continues to be a demand for an energy-efficient actuator system, whereby further also high control dynamics and in the run-up a corresponding signal management, also with a corresponding signal quality, are desirable.

It is now an object of the invention to propose an actuator system of the above-given type which is distinguished by a high energy efficiency and/or a low energy consumption and low power losses, whereby high control dynamics are to be obtainable as well.

For solving the object posed, the invention provides an actuator system as given in claim 1. Advantageous embodiments and further developments are defined in the dependent claims.

In the present actuator system, in which the control system is designed for two or more operating modes, at least one of which can be deactivated and/or activated upon need, one operating mode is a high efficiency operating mode in which an operating mode with a power loss as low as possible and with a high degree of efficiency is ensured, in which influence variables and parameters are optimally adapted for each operating condition. Another operating mode is preferably a high power operating mode which is activated whenever high power is required. During normal operation, when such a high power or maximum power is not required, this high power operating mode is deactivated expediently.

In order to enable an adequate operation which is optimized for each operating mode it is also advantageous to provide for each operating mode a pertinent actuator of its own. Depending on the actuator system this actuator is designed in a manner known per se, e.g. with a pressure cylinder, as piezoelectric converter or the like. However, with a particular advantage, the invention may be applied in connection with electromagnets, in particular for a magnetic bearing, preferably a hybrid magnetic bearing; the magnetic bearing, for example, may be allocated to an energy storing rotor (a so-called "flywheel"). The energy storing rotor may comprise a body made of carbon fiber material enabling particularly high speeds. In this manner, for example, a rotor running at 20,000 to 40,000 revolutions per minute (and more) can be obtained, whereby the kinetic energy is stored above all in the rotational speed of the rotor.

Another advantage is when the control system is arranged to control, search and hold the respective optimum operating point, in particular with regard to the best energy efficiency. In this embodiment, for example when an operating point is shifted because of temperature changes etc., the control system finds the new operating point to then stabilize again the operation at a minimum expenditure of energy. Accordingly, a particularly advantageous embodiment is distinguished in that the control system comprises an optimization controller adjusting the set value of a controller connected downstream, whereby the energy consumption of the actuator and the energy adjuster thereof will become minimal.

In particular in the case of a flywheel rotor, but also in other applications, it is furthermore suitable for safety reasons if with regard to any failure at least one redundant, connectible actuator, preferably with high power control, is provided.

Preferably at least one element in the control system is designed in duplicate to obtain two operating modes; however, it may be of advantage to provide all elements of the control system in duplicate or in multitude so as to ensure an optimized operating mode in the respective mode of operation. In particular, it is also advantageous if the control system is designed to detect an operating situation requiring an activation of the inactive operating mode.

Switching amplifier full bridges are preferably provided for the actuator control.

The present actuator system may also be seen in a preferred embodiment in that it comprises at least one partial actuator which works in all operating modes of the actuator system in the optimum (especially most energy-efficient) operating mode in each case so as to ensure a degree of efficiency as high as possible and/or a power loss as low as possible. The following embodiments and/or cause variables and parameters are perceivable in detail:

Simple or multiple construction of actuators; for example, an actuator may comprise two control element classes for the generation of forces, i.e. on the one hand, a high efficiency actuator element with low forces and minimum losses for standard operation, for example, in active magnetic or hybrid bearings; and on the other hand, a high power actuator element for the generation of large forces in case of need, for example, when starting a rotor, when absorbing external disturbance forces (e.g. earthquake) or during emergency running.

Control of the actuators at a power loss as low as possible, by means of a highly efficient switching amplifier/DC chopper converter combination, in particular with
a (minimum) intermediate circuit voltage adapted to the dynamics necessary in the respective operating condition as well as an immediate switching to maximum intermediate circuit voltage to be carried out in case of need;
a variable (minimally necessary) switching frequency of a DC/DC converter for the variable intermediate circuit voltage and adapted to the respective operating condition;
an energy re-feeding of (inductive) load; and/or
a variable (minimally necessary) transistor switching frequency adapted to the respective operating condition for switching losses as low as possible.

As regards the mechanical construction and material selection e.g. in magnetic bearings, in particular active magnetic bearings, the following measures are advantageous:
at least in high efficiency actuators, a core material of the electromagnets with minimum eddy currents and cyclic magnetization losses is preferred; further, a homopolar magnetic arrangement for the reduction of the cyclic magnetization losses is advantageous.
Also hybrid magnetic bearings with permanent magnets for the provision of static bearing forces and with electromagnets for the provision of dynamic forces are preferably provided.

Furthermore, it is advantageous to provide an operating frequency, adapted to the current operating state, of the
digital controller(s)
analog/digital converter and the
switching frequency and pulse form of the power semiconductor control signals of
power switching amplifiers and/or
direct current converters (for the variable intermediate circuit voltage(s).
Likewise advantageous is the switching between the high efficiency/high power operating modes and/or the switching amplifier intermediate circuit voltage to a maximum value for maximum system dynamics. Preferably all partial portions are optimized to the effect that a maximum energy efficiency is ensured for all operating conditions and to the effect that the parameters variable in operation are automatically adapted for a minimization of loss.

As compared to previous concepts, a main advantage of the invention is found in the essentially lower energy consumption of the actuator system, which is reduced to a minimum in each operating mode of the actuator system.

The invention will be described hereunder in more detail on the basis of particularly advantageous embodiments but will not be limited thereto. More in detail, in the drawings:

FIG. 1 schematically shows in a block diagram the general mechatronic system with embedded actuator already explained above;

Figure 10:
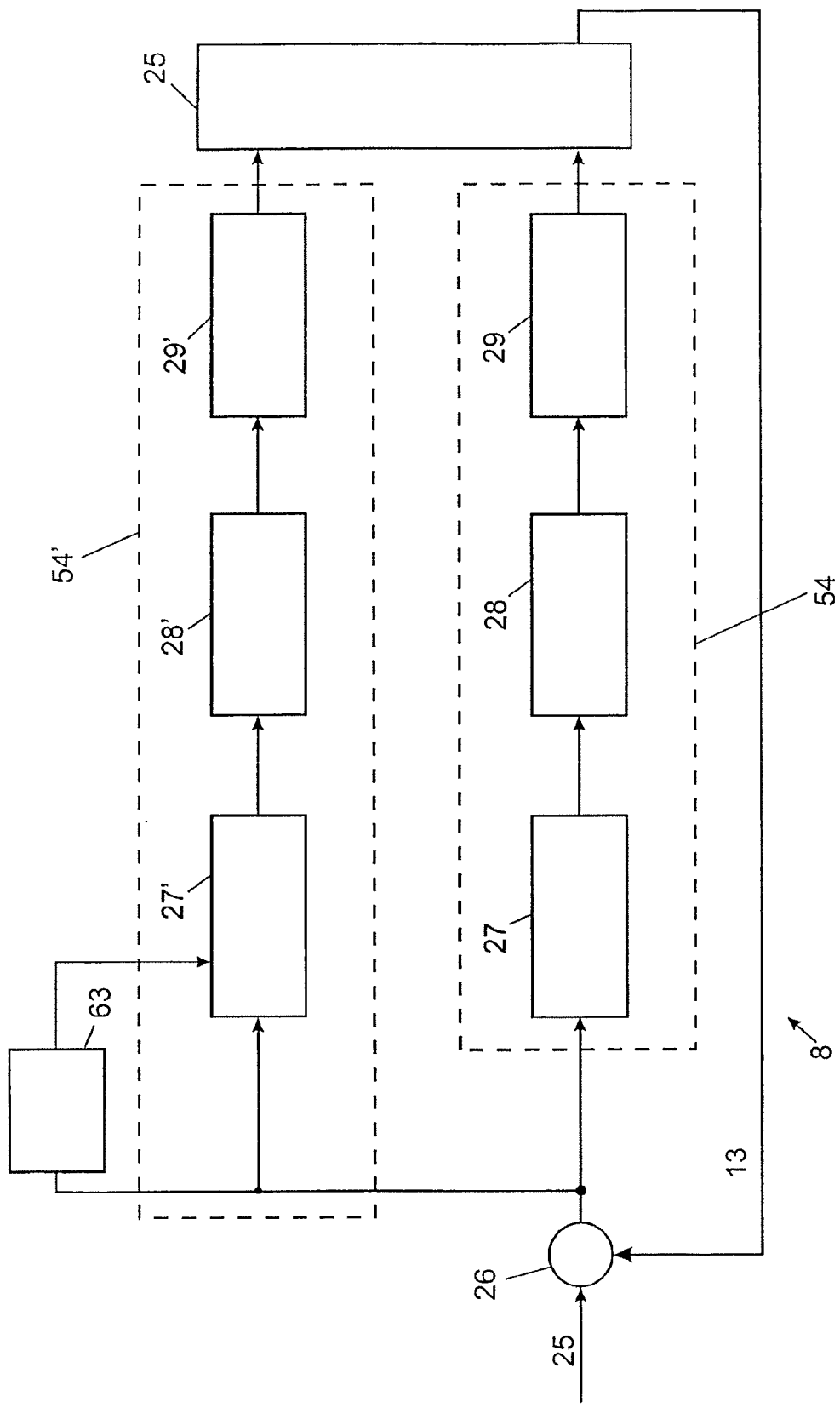
FIG. 10 shows, in a modification of the embodiment according to FIG. 6, a further development in a block diagram, whereby now the actual controller is also configured in duplicate within the control system.
Figure 13:
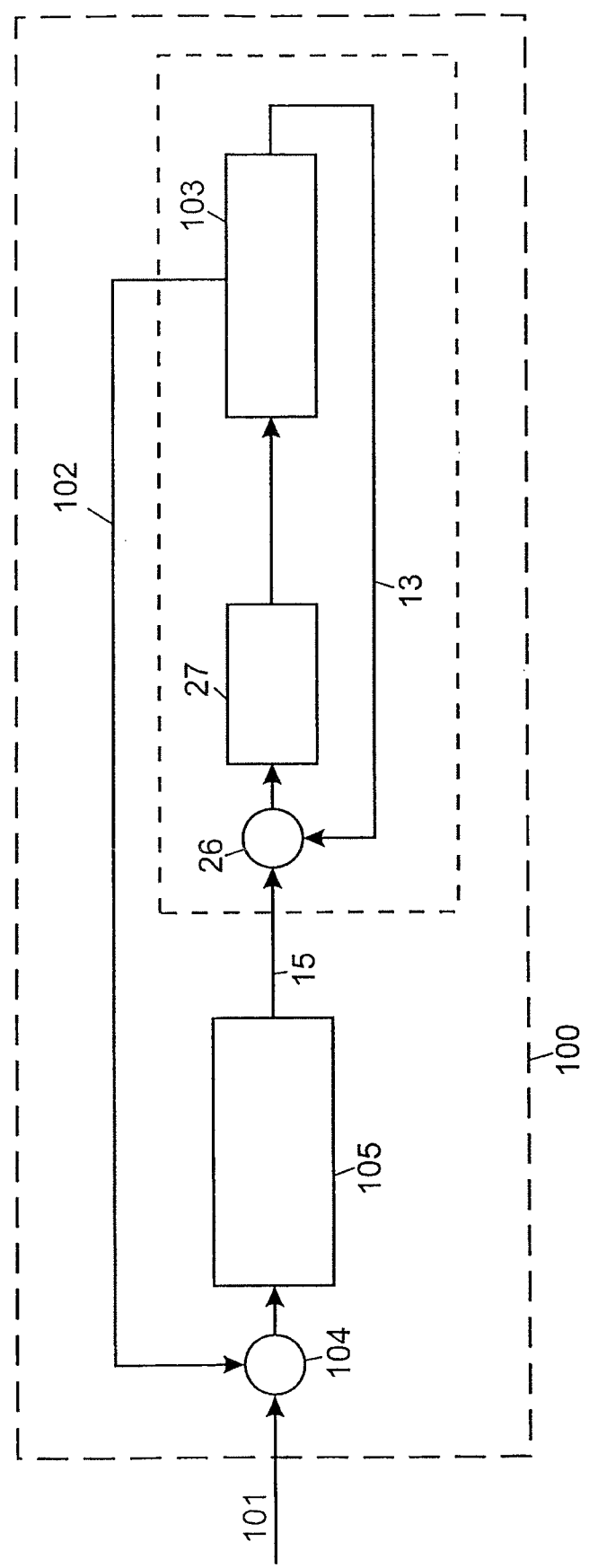
FIG. 13 shows, in a block diagram, an embodiment of an optimization control circuit, which can be used particularly advantageously in the present invention.
Figure 14:
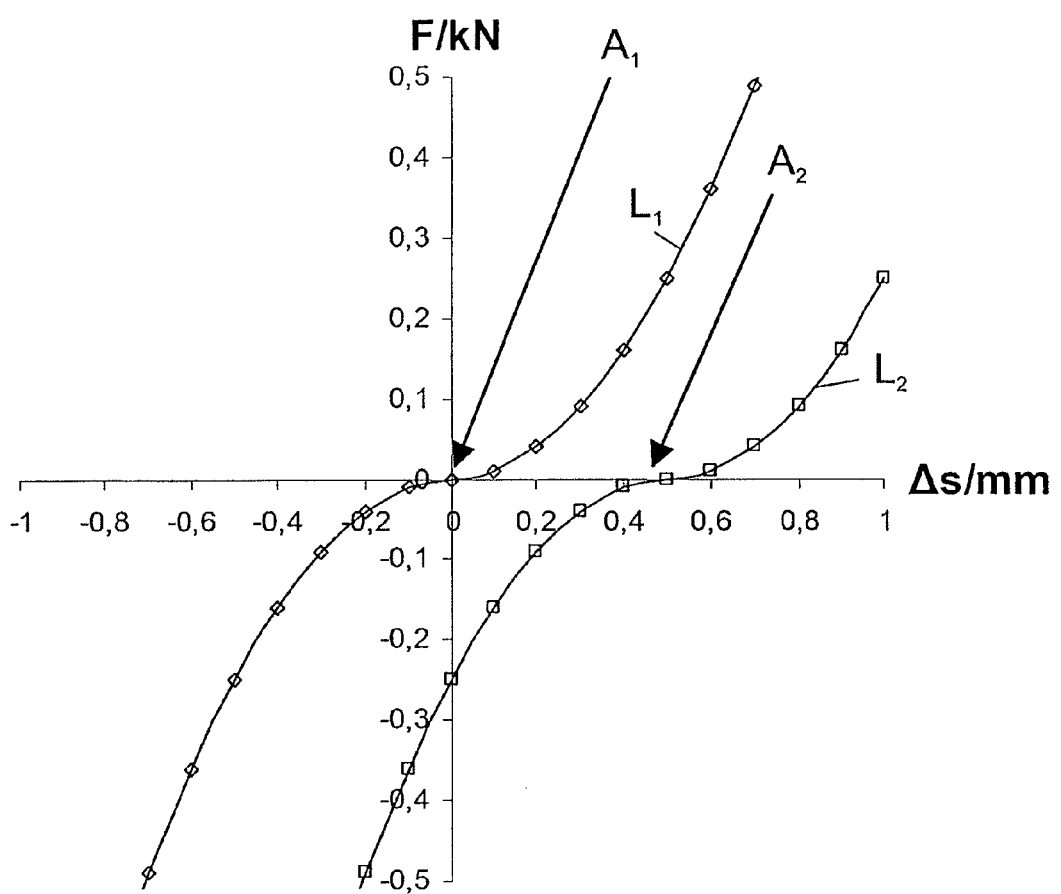
Figure 15:
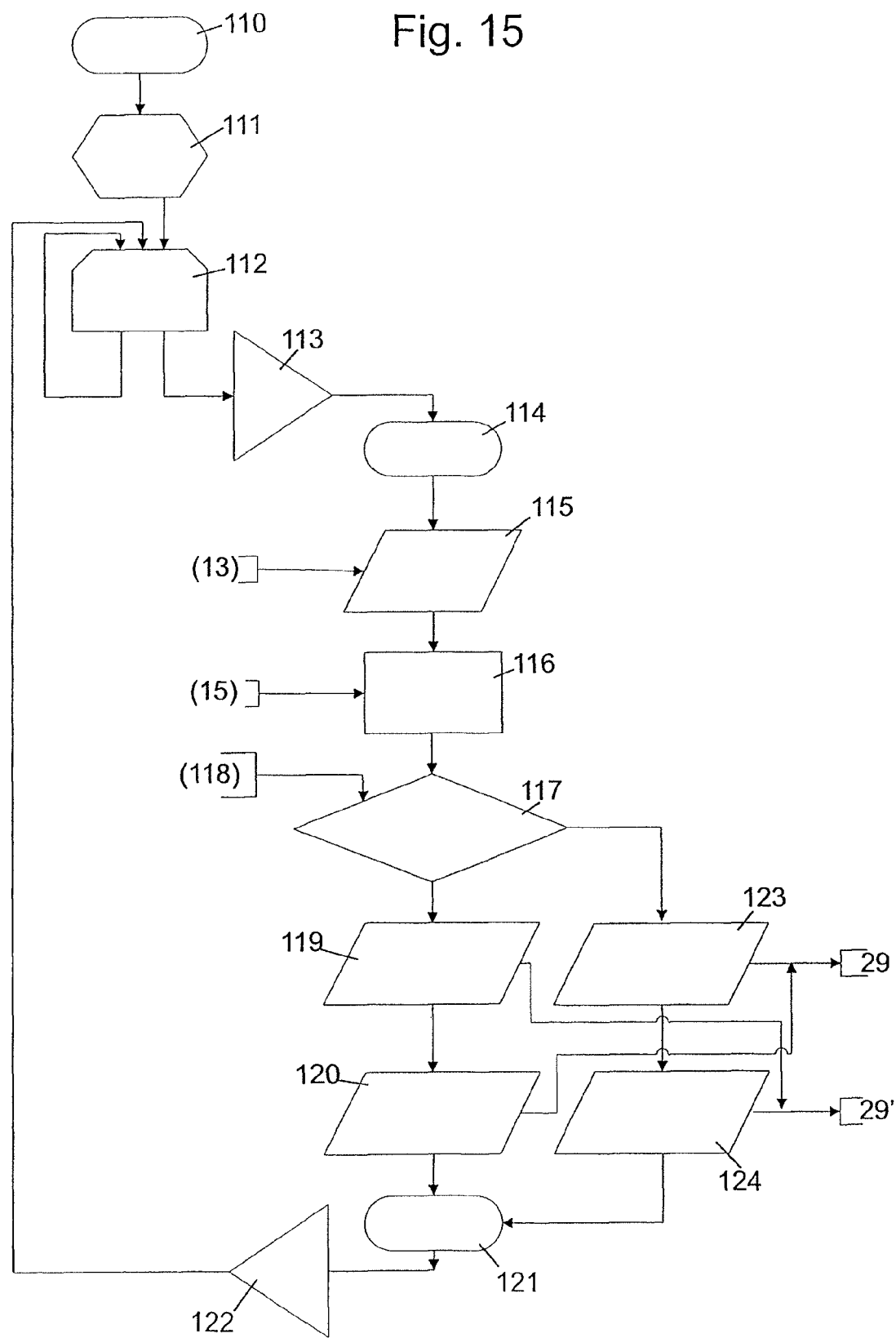

FIG. 14 shows a diagram which illustrates the necessary holding force of e.g. a hybrid magnet-supported rotor at different operating points—which can be determined with an optimization control circuit according to FIG. 13; and FIG. 15 shows, in a flow chart, a procedure for switching an actuator system according to the invention from a high efficiency operating mode to a high performance operating mode or a combined high efficiency and high performance operating mode, for example, in connection with an actuator system according to FIG. 10.

Figure 1:
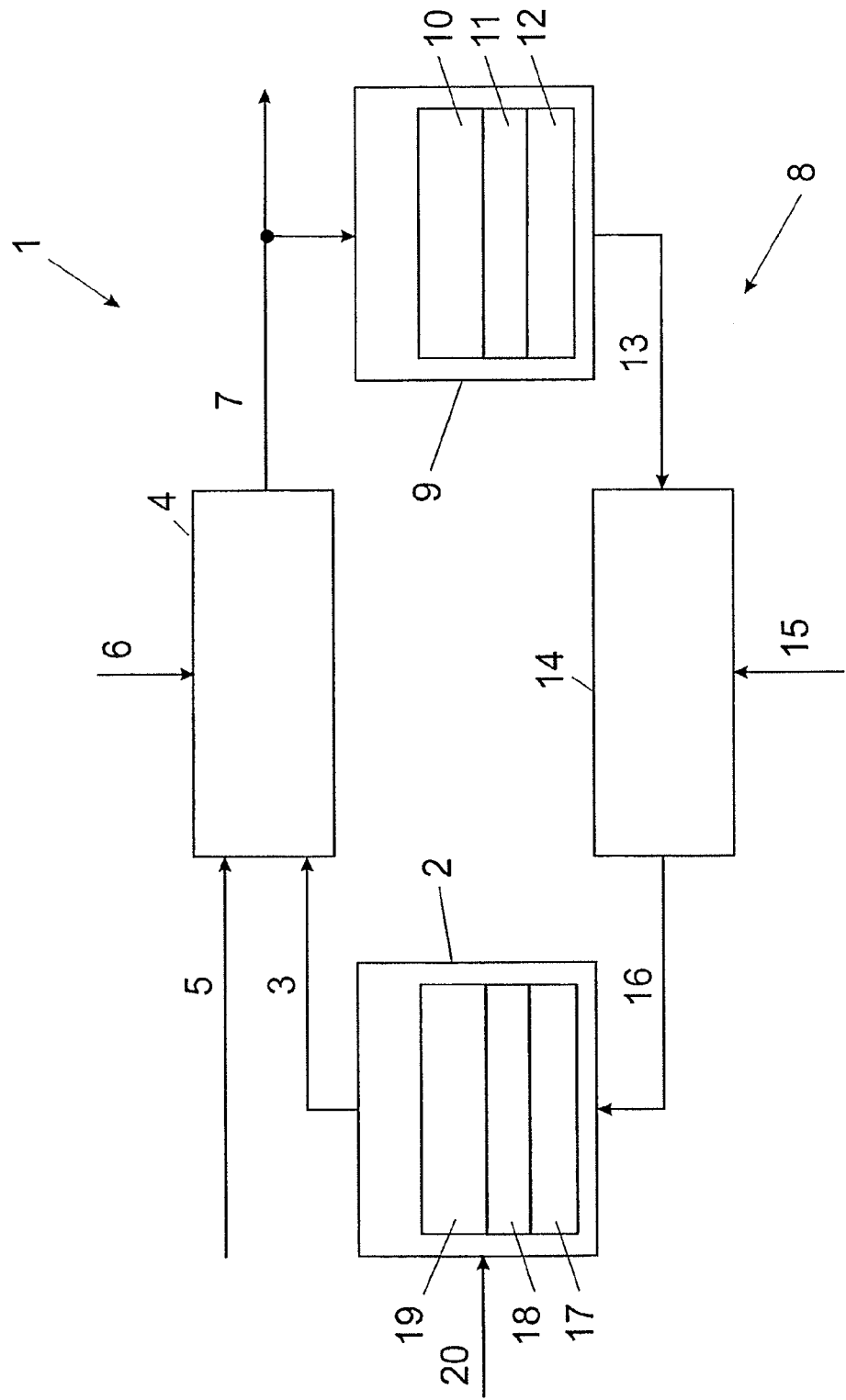
Figure 2:
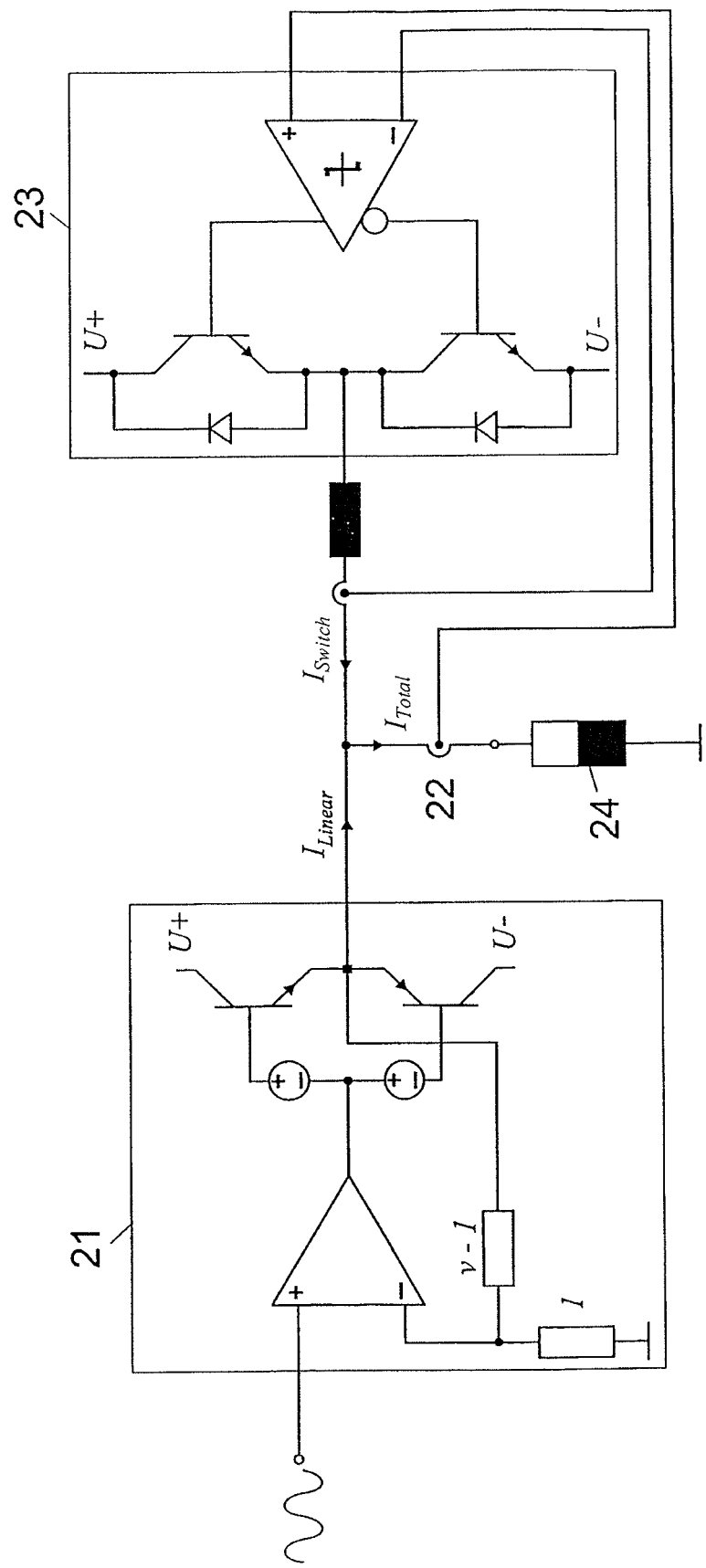
FIG. 2 shows the switching example for a hybrid amplifier also described above.

FIGS. 1 and 2 have been explained above and need not be described again.

Figure 3:
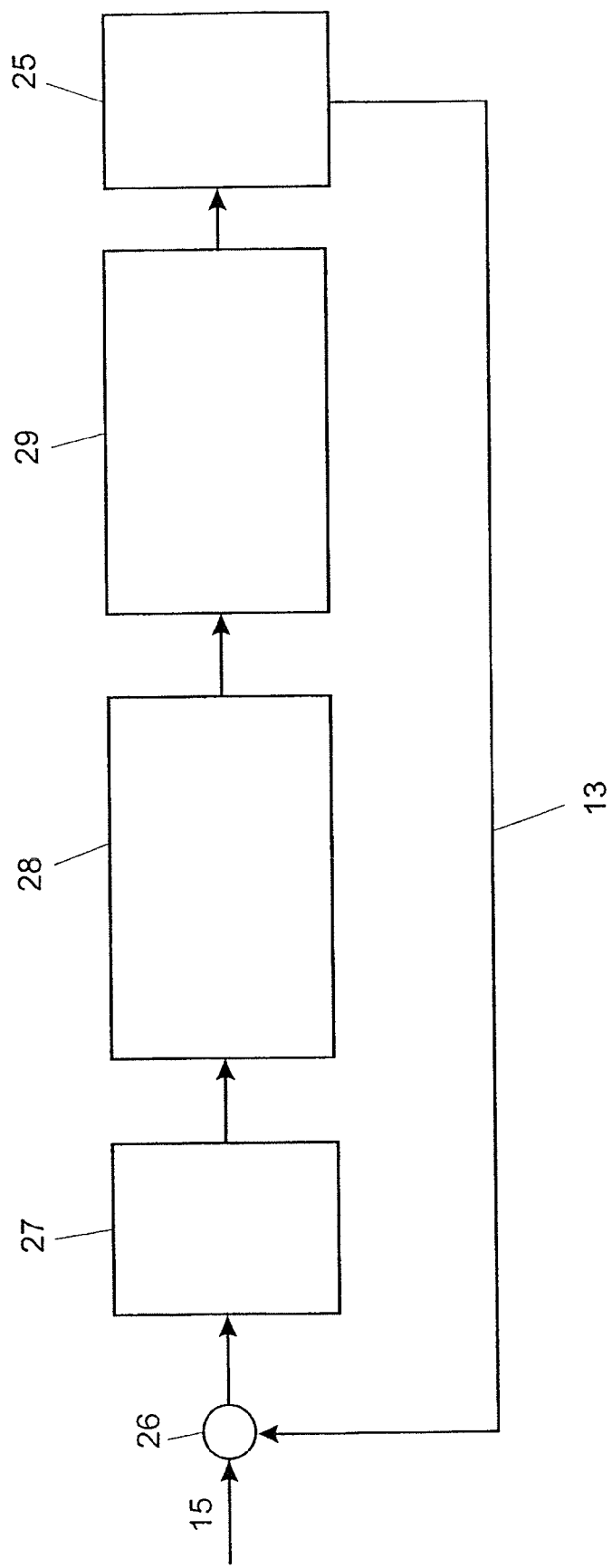
FIG. 3 shows in a block diagram an embodiment of the invention with a combined high efficiency/high power energy adjuster which is switchable with regard to the intermediate circuit voltage.

In FIG. 3, in a representation similar to FIG. 1, a basic system 25 is shown, here with already built-in sensors, from which system the actual value is supplied to a difference generator 26 via an actual value connection 13 (similar to the actual value connection 13 in FIG. 1), the set value 15 being supplied to another input of the difference generator 26. Then, a difference signal is supplied to a controller 27. Said controller 27 and the difference generator 26 thus form the control system 14 according to FIG. 1. Arranged downstream of the controller 27 is a combined high efficiency/high performance (power) energy adjuster 28 whose output is applied to an energy adjuster 29; the two components 28, 29 thus (apart from the signal processing not shown in more detail in FIG. 3) form the actuator 2 in the representation according to FIG. 1.

In the embodiment according to FIG. 3 a high-dynamic switching between a maximum intermediate circuit voltage $U_{ZM}$ and an optimized intermediate circuit voltage $U_{ZV}$ (cf. FIG. 4) is provided to be able to switch between the two operating modes given by the energy adjuster component 28. Said switching and the different intermediate circuit voltages $U_{ZM}$ and $U_{ZV}$ are shown in more detail in FIG. 4.

Figure 4:
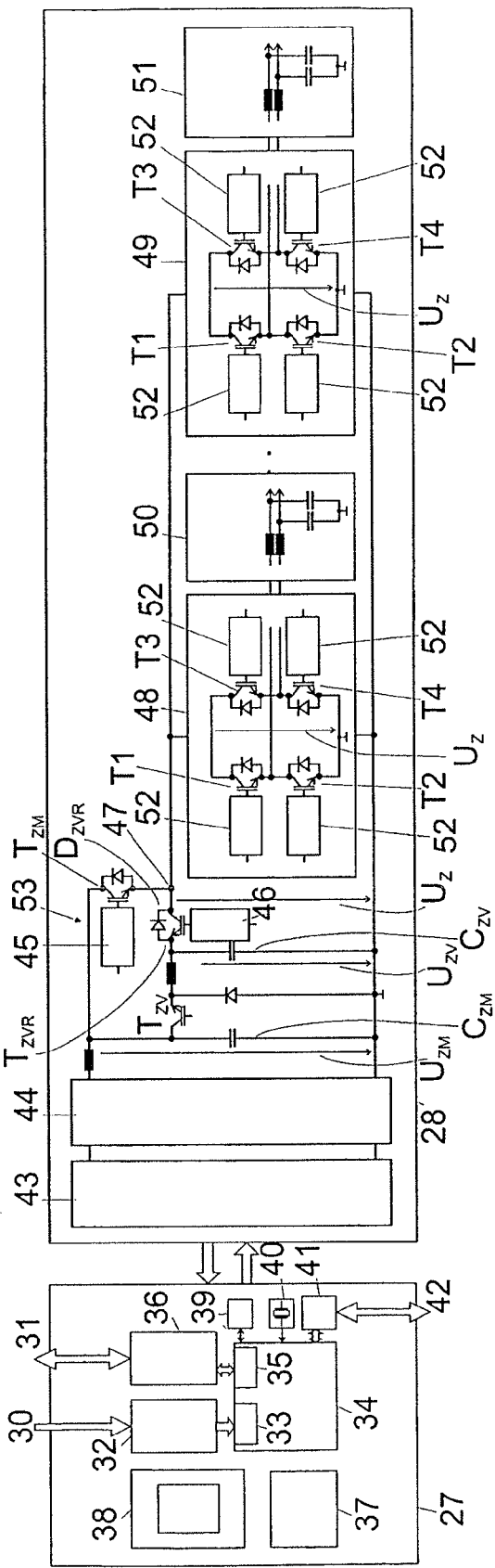
FIG. 4 shows the controller and combined energy adjuster of this system according to FIG. 3 in a more detailed switching configuration.

In detail, in FIG. 4 the components 27 (controller) and 28 (energy adjuster or actuator) are illustrated. It can be recognized that the controller 27 comprises an input 30 for analog signals as well as an input/output 31 for digital signals. In the controller 27 the analog signals are supplied to a controller module 34 via analog channels 32 and an A-D converter 33. Said controller module 34 also comprises a digital input/output 35 which is connected via driver circuits and/or a buffer stage 36 to which the digital signals are supplied from the input 31. Further, in connection with the controller 27, a mains filter 37, an AC/DC converter 38, a monitoring circuit ("watch dog") 39, a timing signal circuit 40 as well as a communication module 41 are schematically shown, via which the controller 27 can communicate with a master computer, not shown in more detail (see connection 42).

The combined energy adjuster 28 comprises a line filter 43 as well as a rectifier- and soft-start unit 44 at whose output the maximum intermediate circuit voltage $U_{ZM}$ is supplied; in case of need, this maximum intermediate circuit voltage $U_{ZM}$ is passed on by means of a transistor $T_{ZM}$, allocated to which is a gate driver 45 for switching on and off. On the other hand, a reduced, variable, optimized intermediate circuit voltage $U_{ZV}$ can be passed on via a switching transistor $T_{ZV}$ and a diode $D_{ZVR}$. At node 47, as intermediate circuit voltage $U_Z$, either—in the case of the high efficiency operating mode of the energy adjuster 28—the optimized intermediate circuit voltage $U_{ZV}$ is applied across the transistor $T_{ZV}$ and the diode $D_{ZVR}$, with the transistor $T_{ZM}$ being blocked; or—in the case of the high performance operating mode—the transistor $T_{ZM}$ is being switched on, whereas the transistor $T_{ZVR}$ is blocked, so that the maximum intermediate circuit voltage $U_{2M}$ is applied at node 47. In the high efficiency case, when the optimized intermediate circuit voltage $U_{ZV}$ is applied to a subsequent full bridge 48 and/or 49, energy may be re-supplied from the load (not shown in FIG. 4) by means of the free-wheeling diodes connected in parallel to the transistors $T_1$ and $T_3$ and/or $T_2$ and $T_4$ (depending on the current direction), whereby in the case of the conducting transistor $T_{ZVR}$ with gate driver 46 about the same (however, negative) current increase as in the intermediate circuit voltage $U_{ZV}$ is given and thereby the energy is re-supplied from the inductive load to a capacitor $C_{ZV}$.

In the case of transistor $T_{ZVR}$ not being activated, the energy is re-supplied, as described above, via the free-wheeling diodes connected in parallel to the transistors $T_1$ and $T_3$ and/or $T_2$ and $T_4$ as well as in this case via the diode connected in parallel to the transistor $T_{ZM}$ in the capacitor $C_{ZM}$.

As far as the full-bridge circuit is concerned, according to FIG. 4 two basically identically designed full bridges 48, 49 are available, downstream of which there is an output filter 50 and 51, respectively. In each full bridge 48, 49 the transistors $T_1$, $T_2$, $T_3$ and $T_4$ each with a free-wheeling diode in parallel connection are present in a bridge circuit, with pertinent gate drivers 52 being provided for switching the transistors T1-T4. The respective energy converters (29 in FIG. 3) each are to be connected or are connected to the output filters 50, 51.

The circuit according to FIG. 4 is designed for a 4-quadrant operation; for a 2-quadrant operation the circuit is to be simplified accordingly, with transistors $T_2$ and $T_3$ as well as the free-wheeling diodes connected in parallel to the transistors $T_1$ and $T_4$ being omitted.

During operation analog actual values are read in at 30, wherein these analog actual values may relate to, for example, the position, current, temperature or like parameters. Said actual values come from sensors (9 in FIG. 1) and are supplied to the controller 34 via the analog channels 32 under analog signal processing, filtering via the A/D converter 33. Digital actual values get into the controller 27 at 31, and these digital actual signals may, for example, come from an optical rotation angle encoder. Controlling algorithms in the controller module 34 may be available as software, whereby the controller module 34 may not only be constituted by a digital signal processor but also by a microcontroller or a FPGA unit.

In the present control system according to FIGS. 3 and 4, element 53, by means of which the intermediate circuit voltages $U_{ZM}$ or $U_{ZV}$ are applied, is designed in duplicate, i.e. one time with branch $T_{ZM}$ and the other time with branch $T_{ZV}$ and $D_{ZVR}$, whereby the normal operating mode is the high efficiency operating mode with the optimized intermediate circuit voltage $U_{ZV}$ in which the switching transistor $T_{ZVR}$ is ON and $T_{ZM}$ is OFF. The dynamic switching on and off of the transistors is effected by the gate drivers 45.

The energy converters 29 which are to be or are connected to the output filters 50, 51 may, for example, be bearing magnets of a magnetic bearing. The optional communication via the connection 42 to a master computer may serve the purpose of control, display and/or monitoring.

Figure 5:
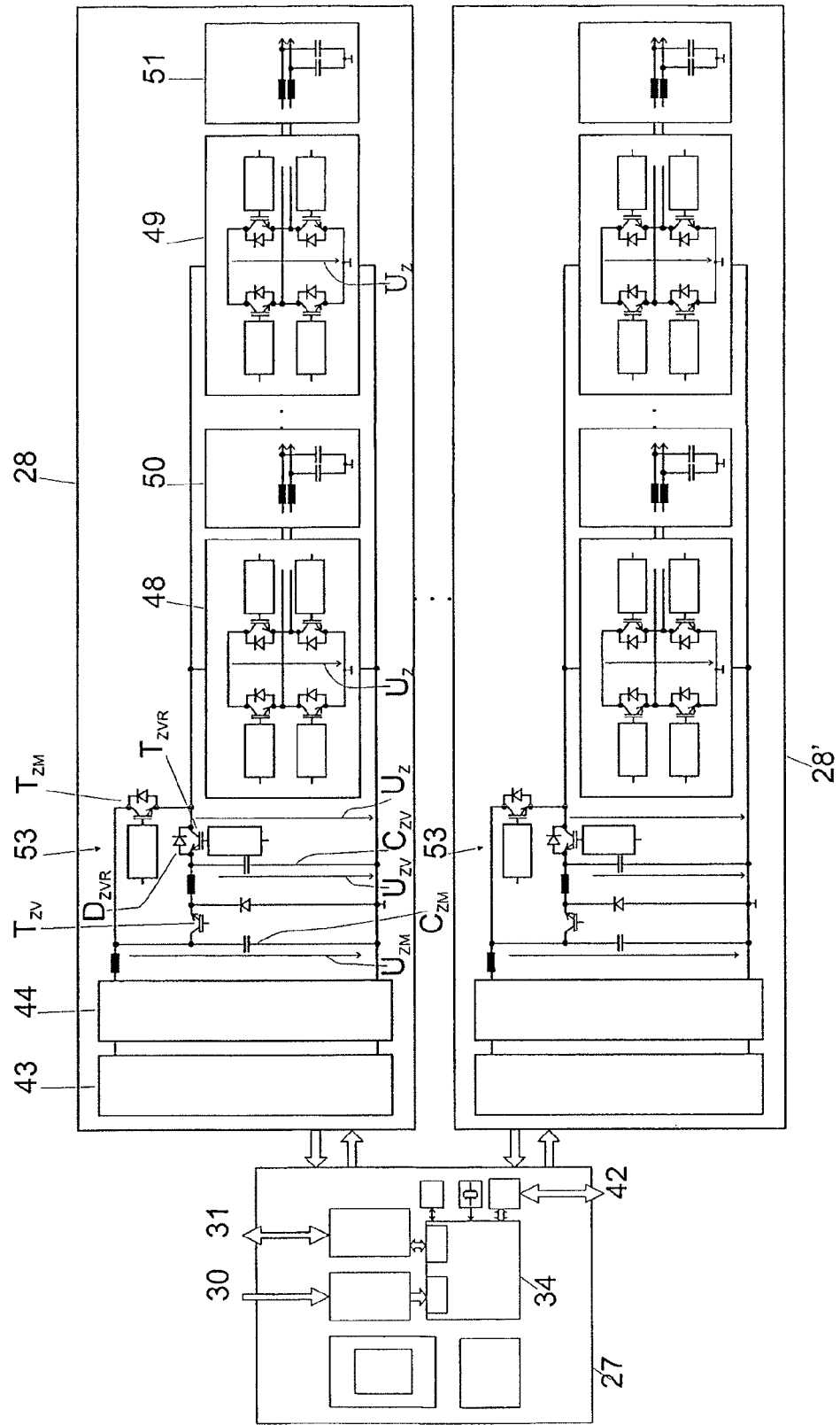
FIG. 5 shows an embodiment of the combined energy adjuster which as compared to FIG. 4 has been improved by the provision of a parallel system.

The embodiment according to FIG. 5 essentially corresponds to that according to FIG. 4, with several, e.g. two, parallel energy adjuster systems being provided; in this connection, one of the two combined energy adjusters 28 may be provided for the radial support and the other combined energy adjuster 28' for the axial support of a rotor or else a shaft. Since the energy adjusters 28, 28' are basically constructed identically to the energy adjuster according to FIG. 4 there is no need to describe them again. The same also applies to controller 27. It is to be pointed out that the intermediate circuit voltage may possibly be selected differently for each energy adjuster 28, 28', whereby the optimum intermediate circuit voltage is selected in dependence on the active energy adjuster (bearing magnets).

In FIG. 5, just as in FIG. 4, the area with double configuration of an element of the control system, i.e. the switching section, is additionally illustrated as element 53.

Figure 6:
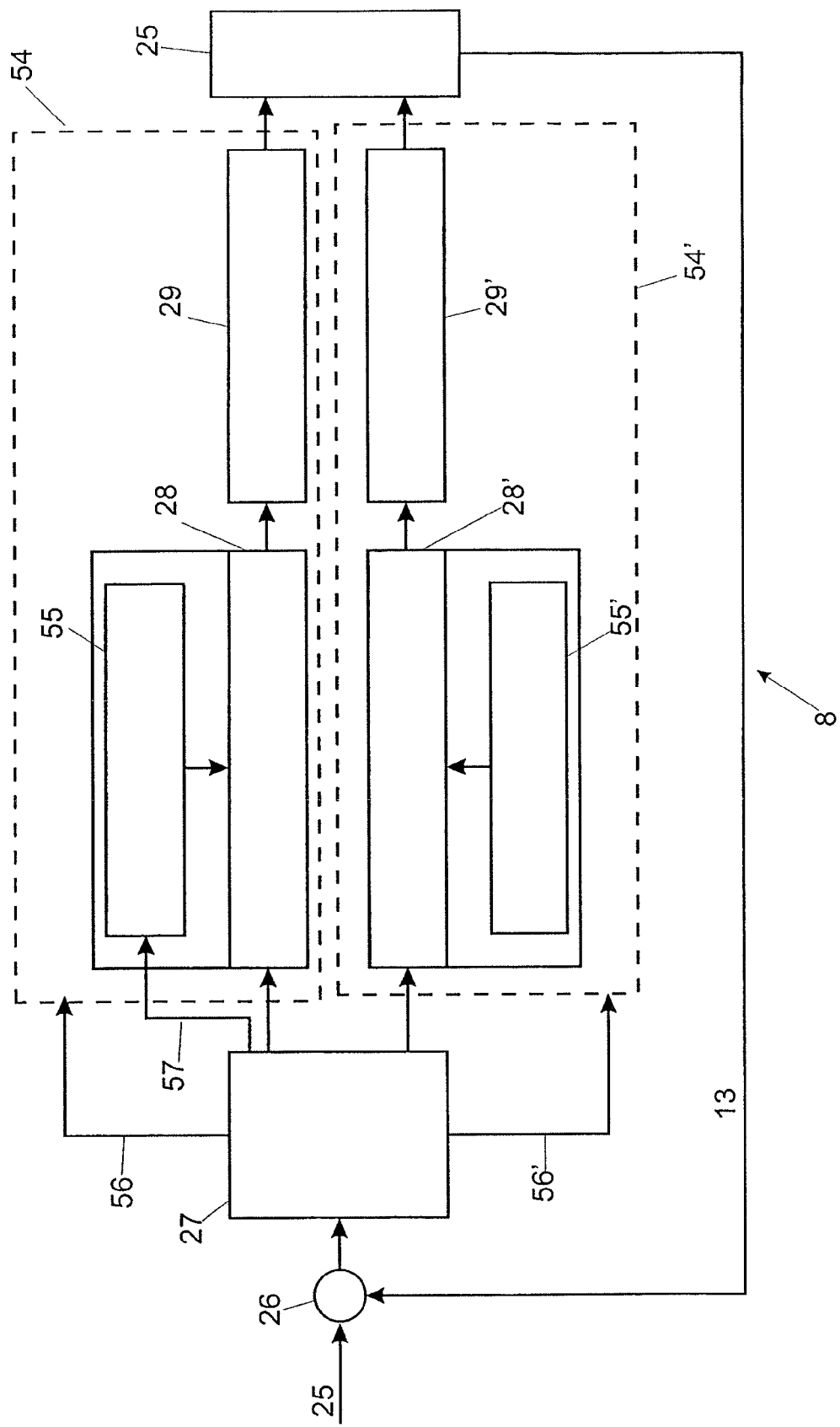
FIG. 6 shows, in a schematic block diagram similar to FIG. 3, a further embodiment of the actuator system according to the invention, with a duplication of the energy adjuster and energy converter to obtain a high efficiency system and/or high performance (power) system.
Figure 7:
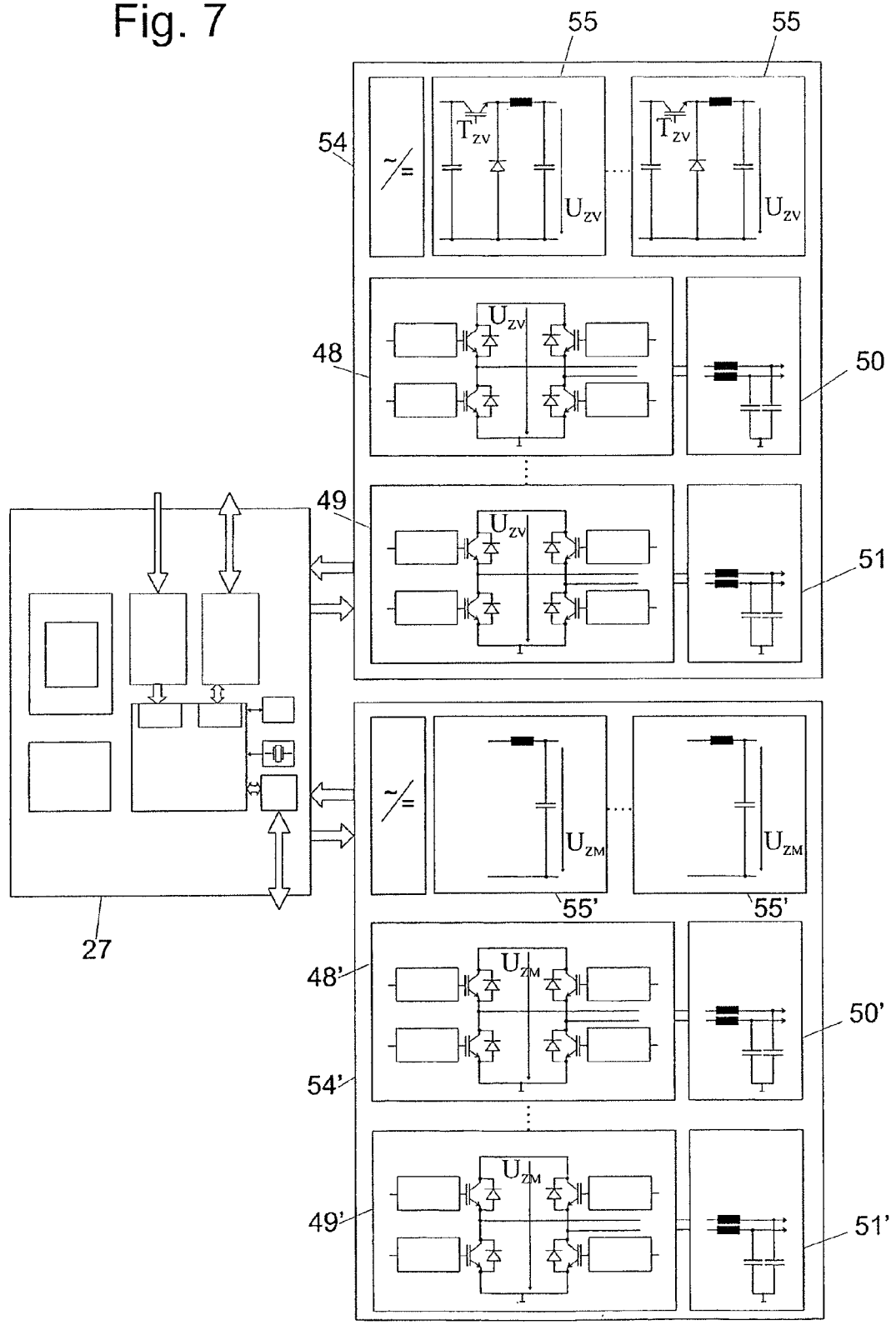
FIG. 7 shows a more detailed switching configuration of an actuator system corresponding to FIG. 6, similar to FIGS. 4 and 5.

In the embodiment according to FIGS. 6 and 7 other elements of the control system (8 in FIG. 1) are designed in duplicate so as to connect separate systems, that is a high efficiency system 54 as well as a high performance system 54' downstream of a joint controller 27. The high efficiency system 54, similar to what has been described above with regard to FIG. 4, comprises an energy adjuster 28 with variable intermediate circuit 55, with full-bridge circuits 48, 49 (with transistors $T_1$ to $T_4$) and with output filters 50, 51, as shown in FIG. 4. In the high performance system 54' a constant intermediate circuit 55' of its own is allocated to the actual energy adjuster 28' to provide the constant, maximum intermediate circuit voltage $U_{ZM}$ in this high efficiency system 54'. Reference numerals 29 and 29' in turn designate energy adjusters, e.g. bearing magnets, and finally in FIG. 6 the basic system 25 is also shown. Further, starting from the controller 27, a connection 56 and 56' is schematically provided for activating and deactivating the respective system, i.e. the high efficiency system 54 and the high performance system 54', as well as a connection 57 for the control of the variable intermediate circuit 55.

In FIG. 7 a more detailed circuit design corresponding to FIG. 6 (similar to the one according to FIG. 5) is shown. In the area of the high efficiency energy adjuster 54, variable intermediate circuits 55, furthermore full bridges 48, 49 and output filters 50 and 51 are illustrated, whereby for a more detailed illustration reference is made to FIG. 4. The high performance system 54' comprises constant intermediate circuits 55', similar to what results from FIG. 4 (when imagining that the switching transistors $T_{ZM}$ or $T_{ZV}$, $T_{ZVR}$ do not exist) and further corresponding full-bridge connections 48', 49' as well as output filters 50', 51' are provided. The high performance energy adjusters 29' are connected to these output filters 50' or 51', whereas high efficiency energy adjusters 29 are connected to the output filters 50, 51 of the high efficiency system 54 (see FIG. 6). The same applies here, i.e. that the intermediate circuit voltages $U_{ZM}$ or $U_{ZV}$ may very well be different (e.g. for each full bridge).

The controller 27 in the embodiment according to FIGS. 6 and 7 is equipped with corresponding high efficiency and high performance algorithms to operate the high efficiency system 54 as well as the high performance system 54'. The controller 27 may provide an optimization control for the high efficiency system 54, as will be illustrated in detail below on the basis of FIGS. 13 and 14. This also applies to the embodiments illustrated so far.

Figure 8:
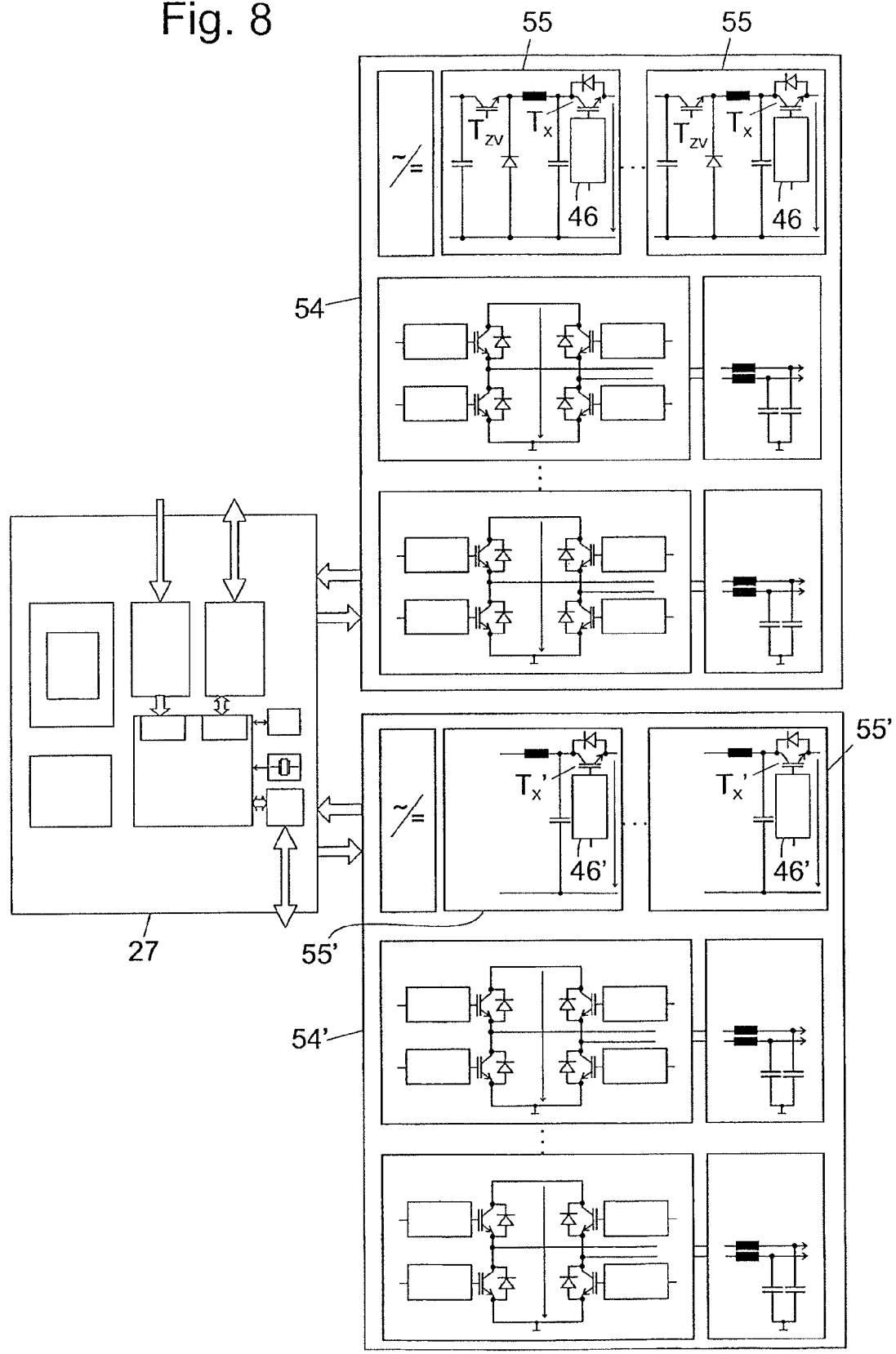
FIG. 8 shows, as compared to FIG. 7, a further development in which the energy supply of the non-activated (or possibly defective) elements of the control system are switched off in the high performance energy adjuster.

The embodiment according to FIG. 8 essentially corresponds to that according to FIG. 7, the difference being that switching transistors $T_{X'}$ are provided in the constant intermediate circuits 55' to be able to switch off the energy supply of non-activated and/or defect elements of the control system for the high efficiency system 54'. In a similar manner, switching off of non-activated or defective elements of the control system with the help of transistors $T_X$ is also provided for the high efficiency system 54. These transistors $T_X$, $T_{X'}$ are provided on the output side of each variable or constant intermediate circuit 55 and 55', respectively, and in turn are controlled via gate drivers 46 and 46', respectively.

Figure 9:
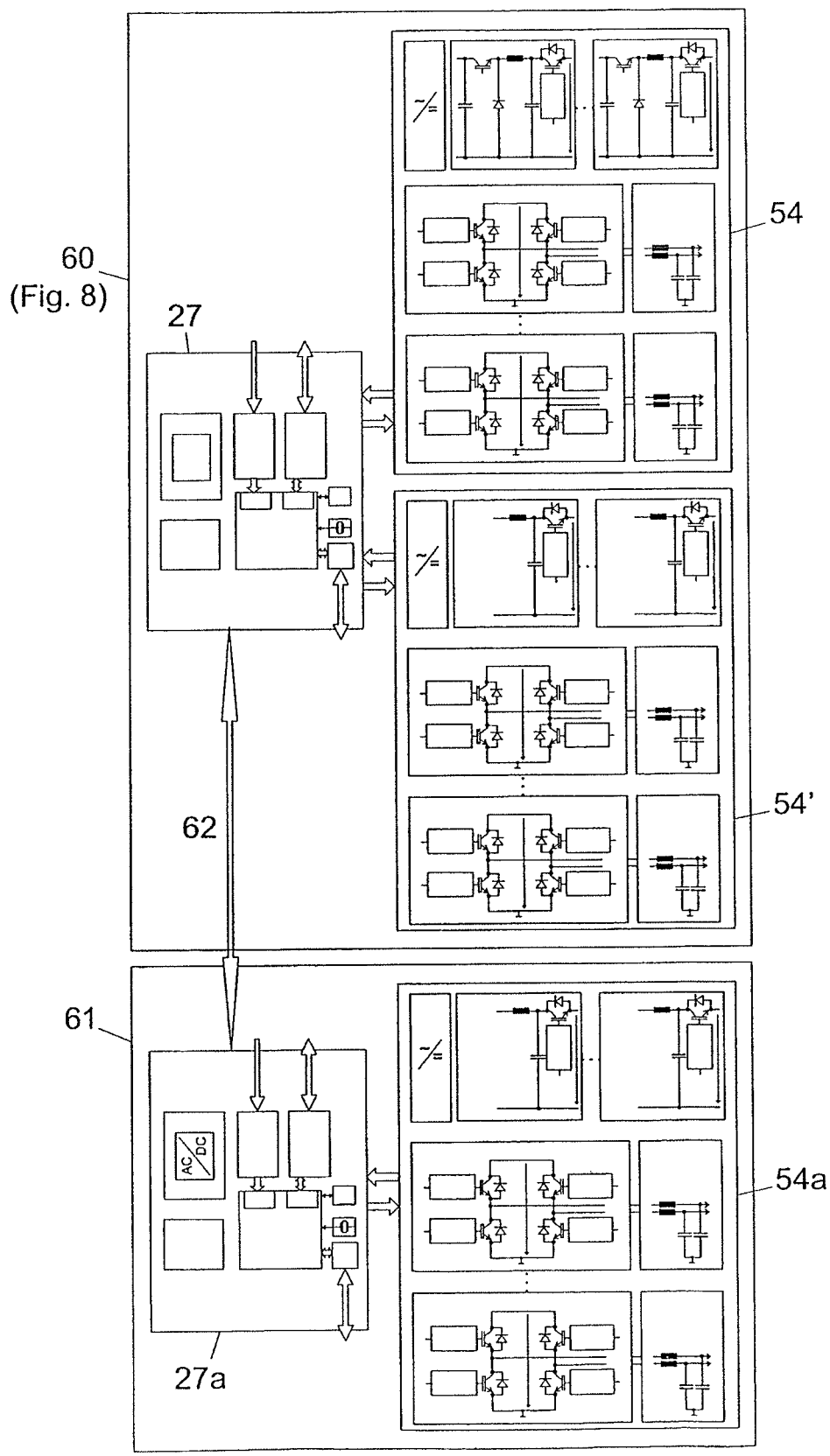
FIG. 9 shows, by way of further development of the embodiment according to FIG. 8, an embodiment with a redundant, additional system so as to be able to switch over to the additional, redundant system in the case of a failure of the system comprising the high efficiency energy adjuster and high performance energy adjuster.

In FIG. 9, starting from the embodiment according to FIG. 8, which corresponds to a primary system 60 illustrated in the upper portion of FIG. 9, a redundant control system 61 comprising a controller 27a of its own and a redundant high performance energy adjuster 54a of its own are shown additionally. The redundant system 61 communicates via a connection 62 with the primary system 60, whereby in the case of the occurrence of any error or any disorder in the primary system 60 the control may be switched to the redundant system 61. The local error detection of the systems 60, 61 as well as a mutual error detection is effected by means of a technology known from the prior art. The high performance system energy adjuster 54a of the redundant system 61 may be constructed identically to the high performance energy adjuster 54' of the primary system.

In the embodiment according to FIG. 10, as compared to that according to FIG. 6, a duplication of the actual controllers is also provided in addition, see the controller 27 (in the high efficiency system 54) as well as 27' (in the high performance system 54'). Furthermore, energy adjusters 28, 28' and energy converters 29, 29' are provided in duplicate. In addition, in the high performance system 54', a recognition and activating/deactivating unit 63 is connected upstream of the controller 27', which in the case of major deviations of the actual value (connection 13) from the set value 25, see difference generator 26, activates the control system of the high performance system 54'—e.g. additionally—whereby the high efficiency system 54 continues to be active. The recognition or activating/deactivating unit 63 may be realized for example by, means of a window comparator.

Figure 11:
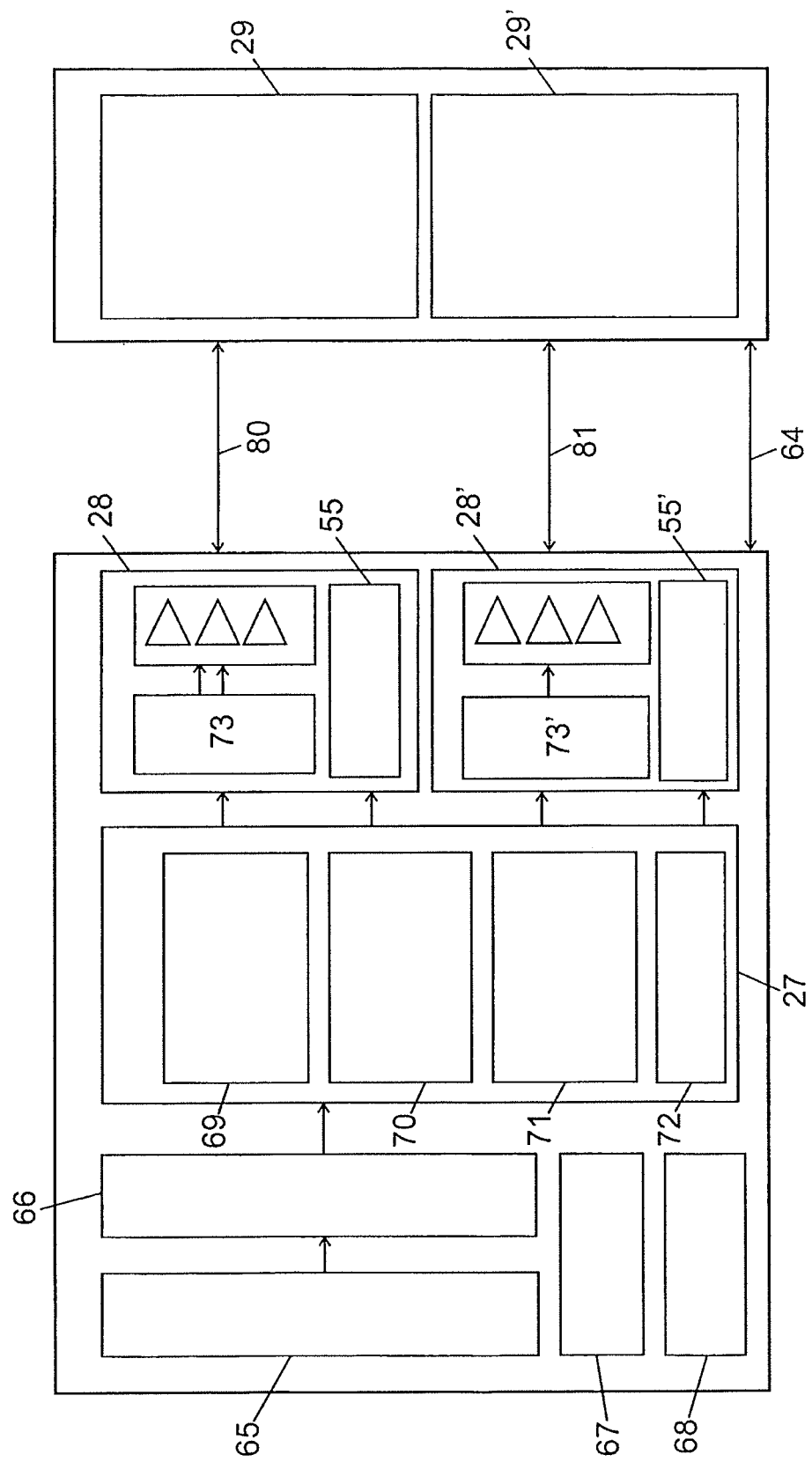
FIG. 11 shows a diagram of a general actuator system, without a redundant high performance system, for a hybrid magnetic bearing.

In FIG. 11 an exemplary application of the present energy-efficient actuator system is shown on the basis of an electromagnetic actuator (hybrid magnetic bearing) for the contactless magnetic support of a rotor.

The application of active magnetic bearings (AMB—active magnetic bearing) is based on the principle of electromagnets. By means of coils a magnetic flux is generated exerting an attracting force between the ferromagnetic stator and a ferromagnetic element separated by an air gap of the structure (here rotor) to be supported. Beside the energy converters 29, 29', the necessary assembly groups include the controller 27, sensors 9 (typically: distance and current; see also the exemplary sensor connection line 64 in FIG. 11) and energy adjuster (power amplifier) 28, 28'.

According to FIG. 11, a sensor signal conditioning unit 65 as well as an A/D converter 66 are connected upstream of the digital controller 27. Further, the detection of parameters such as rotation angle, temperature as well as an error recognition and deactivation indicated with a block 68 are indicated schematically with a block 67.

Further, in controller 27 an adaptive vibration control (AVC) is indicated with a block 69; a component for an adaptive controller sampling rate is indicated with a block 70; the adaptive intermediate circuit voltage control with a block 71; and communication to a master computer is indicated with a block 72. The energy adjusters 28 and 28' in turn contain a variable intermediate circuit 55 and a constant intermediate circuit 55', respectively, as well as further a module for adaptive PWM (pulse width modulation) 73 in the energy adjuster 28 and a PWM module 73' in the high performance energy adjuster 28'.

The present actuator system makes possible a magnetic support with an essentially higher energy efficiency than with conventional magnetic bearing systems and with minimum cyclic magnetization losses. In this connection, the actuator particularly (as will be illustrated below on the basis of FIG. 12) consists of a cascaded hybrid magnetic bearing system, consisting of a combination of permanent magnetic bearings for generating the static bearing forces, high efficiency AMBs with minimum energy consumption for the operative leveling of the dynamic forces, and high performance AMBs for start-up, absorption of large deflections and/or an emergency operation. During normal operation only the high efficiency AMB or system is used. As soon as the control detects that the bearing forces generated thereby are not sufficient to prevent any inadmissible deviation of the rotor, the high performance AMB or system, which is deactivated during normal operation, will be switched on automatically. At the same time, for obtaining the maximum possible bearing force, the intermediate circuit voltage $U_Z$ of the power switching amplifier of the high efficiency AMB is increased to a maximum value $U_{ZM}$ starting from the actual operation state. As soon as the necessary bearing force of the high efficiency AMB is sufficient again, the high performance AMB automatically will be switched off to stand-by mode.

The control of the cascaded hybrid magnetic bearing system is realized by means of the fully adaptive digital controller 27 and comprises the following core issues: active vibration control (module 69), adaptive controller sampling rate (module 70) for an energy consumption of the digital controller 27 as low as possible, adaptive pulse width modulation frequency (module 73) for controlling the power switching amplifier for losses as low as possible in the gate drivers and power semiconductors, adaptive intermediate circuit voltage control (module 71) for minor losses of power switching amplifiers and automatic switching on of the high performance AMB 28', 29' in dependence on the current operating mode of the high efficiency AMB 28, 29.

The control of the redundant high performance AMB system (61 in FIGS. 9 and 12) essentially corresponds to the control of the high performance AMB 54'; in addition, however, the switching on is implemented in the case of a malfunction of the combined high efficiency AMB/high performance AMB system.

For an energy consumption as low as possible as a result of a minimum number of components as well as a maximum signal quality and sturdiness vis-à-vis external interference signal inputs, a direct digital control of the power transistors may be provided by using a 3-level-PWM (see modules 73, 73'). This 3-level PWM is designed especially with regard to low switching losses with uniformly dividing the switching losses to all full-bridge transistors $T_1$-$T_4$ as well as low high frequency interference signal portions in the amplifier output signal.

As regards the above described switching amplifier full bridges 48, 49 and 48', 49' the aims pursued in the power amplifiers used for controlling the electromagnets of the high efficiency AMBs and the high performance AMBs are different. The power amplifiers of the high efficiency AMB have a high efficiency because of the adaptation of the intermediate circuit voltage $U_{ZV}$ to the force increasing speeds necessary in the respective operating mode as well as the adaptation of the pulse-width frequency to the rotor speed, especially in the partial-load operating range. For example, the switching losses at a reduced rotor speed and/or at a reduced force-increasing speed may essentially be reduced thereby. The power semiconductors are selected expediently with regard to an optimum of transmission losses, switching losses, gate capacity and reverse recovery losses. As regards the power amplifiers of the high performance AMB 28', 29' the focus is mainly on a safe disconnectability despite any possible malfunction of the gate driver or power semiconductor. Disconnection within a few microseconds is advantageous in this case so as to avoid any destabilization of the rotor to be supported. The power loss is of secondary importance, since the high performance AMB is not switched on during normal operation.

The intermediate circuits of the high performance AMB do not have any voltage control.

The examples discussed on the basis of FIGS. 4 and 5 for possible embodiments of the energy-efficient actuator control for a 4-quadrant operation have a highly dynamic, switchable intermediate circuit voltage $U_Z$ of the individual full bridges, which for example may consist of the voltage taking the maximum value $U_{ZM}$ for any suddenly required maximum dynamics and of the controllable voltage $U_{ZV}$ optimized for the respective operation state. However, several switching amplifier full bridges may also be used, for example, connected in parallel via coupling inductances or for driving different actuators (e.g. high efficiency/high performance actuator, see FIGS. 7 to 9). The variable intermediate circuit voltage $U_{ZV}$ is generated by a DC/DC converter, formed with the assembly group about the transistor $T_{ZV}$. In this connection, the power switching transistors and also the gate driver circuits may be optimally adapted to the necessary power requirements of the bridges.

Figure 12:
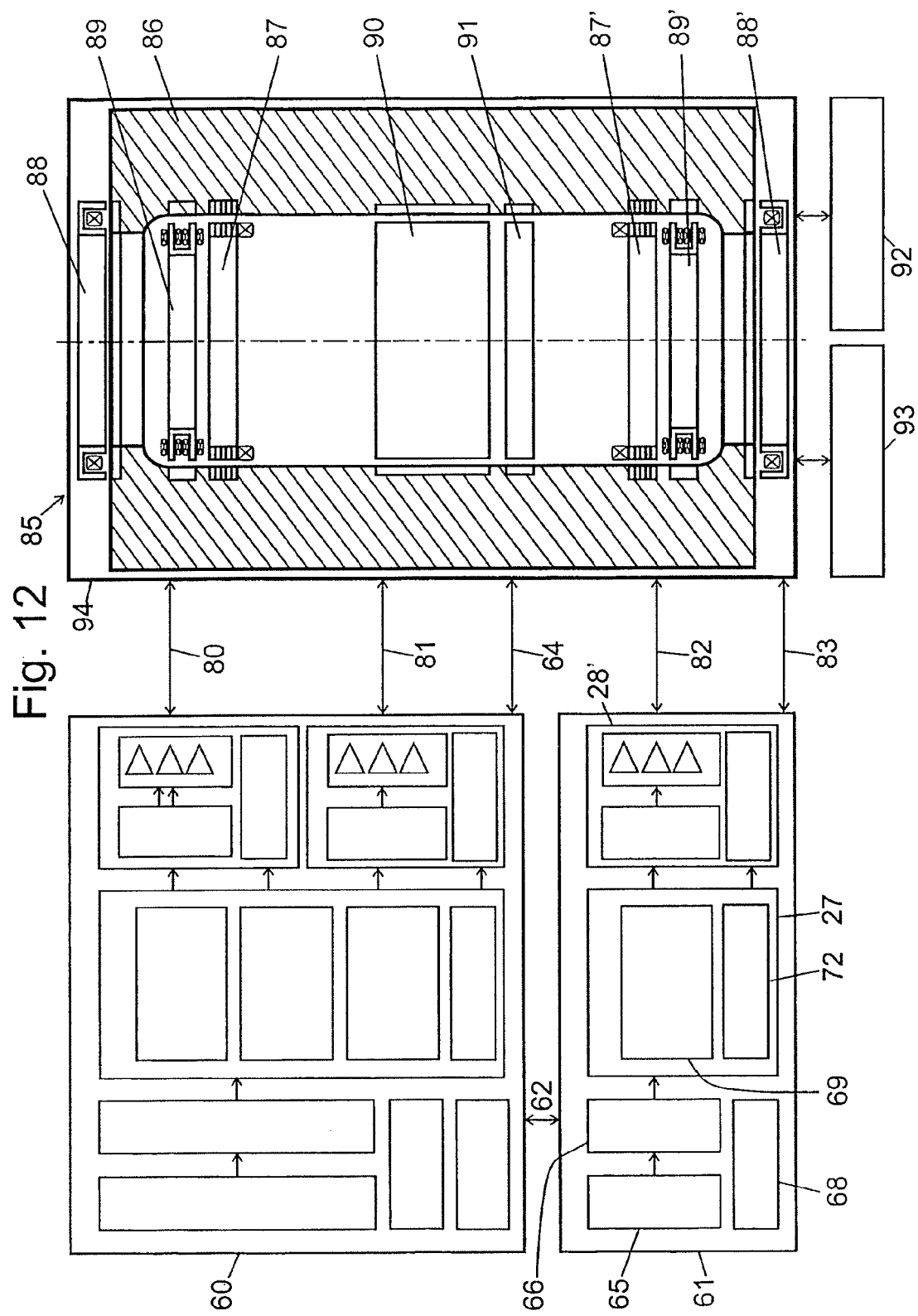
FIG. 12 shows, in a diagram, an embodiment of the actuator system according to the invention when being applied in an energy-storage flywheel in the form of a flywheel storage device supported by means of an active hybrid magnetic bearing.

FIG. 12 illustrates a particularly advantageous application of the present, energy-efficient actuator system, i.e. for the support in a flywheel storage device. In FIG. 12 the block 60 on the left top side corresponds to the combined high efficiency/high performance AMB (closed-loop control and control) according to FIG. 11 (without the actuators 29, 29'). Further, as described above on the basis of FIG. 9 already, a redundant high performance AMB 61 (closed-loop control and drive) is provided, whereby here, too, a module 65 for the sensor signal processing, an A/D converter module 66, a module 68 for the error detection and deactivation as well as—within the controller 27—an AVC module 69 as well as a module 72 for the inter-AMB communication are illustrated. Furthermore, as illustrated, a high performance amplifier 28' is also provided as energy adjuster. The connections 80, 81, 64, 82 and 83 in FIG. 12—in this order—indicate the control of the high efficiency electromagnets, the control of the high performance electromagnets, the transmission of the distance sensor signals as well as furthermore the control of redundant high performance electromagnets and the transmission of redundant distance sensor signals. (Corresponding control connections 80, 81 are also indicated in FIG. 11).

On the right-hand side of FIG. 12 there is illustrated the above-mentioned flywheel energy storage 85 comprising a rotor 86, this rotor 86 being supported magnetically and including a mechanical emergency bearing (not shown in more detail in FIG. 12). A hybrid magnetic support with permanent-magnetic support and active electromagnetic support according to the above principles is provided to support the rotor 86. The hybrid bearings (e.g. radial-stable, axial-unstable, active-stabilized) are indicated in FIG. 12 at 87, 87'. The permanent-magnetic support is designed such that the bearings of the rotor 86—at a particular operating point (position)—have a stable balance in some of its six degrees of freedom and a meta-stable or unstable balance in the remaining degrees of freedom.

Further, in FIG. 12 two axial high performance bearings 88, 88' as well as two radial high performance bearings 89, 89' are illustrated, just like a motor/generator 90 and a generator 91 for the power supply of the redundant magnetic support, furthermore a power converter 92 and an emergency power converter 93.

The rotor 86, i.e. the flywheel, is a ring-shaped external rotor of the basically conventional construction, whereby e.g. carbon/Kevlar/fiber glass materials may be used as materials. The body of the rotor 86 preferably consists of a carbon fiber material having a high tear strength, which is particularly important in the high speeds desired here (20,000-40,000 rpm and over). The support is particularly important for high-efficient flywheel storage devices and the contactless, magnetic bearings, in particular AMBs, have proven to be the optimum technology for the high speeds aimed at. The energy-efficient actuator system described herein is suited therefor in a particularly advantageous manner.

Basically the energy storage times obtainable with flywheel storages also depend on the atmospheric friction losses because of rotation (depending on the air pressure and depending on the form) as well as on the braking torque of the motor/generator 90, apart from the above-described bearing losses because of cyclic magnetization losses. In order to perform fast rotation in a preferably air-friction-free manner, the rotor 86 is advantageously accommodated in an enclosed container 94 which is advantageously evacuated. Also for safety reasons, this container 94 is of advantage with regard to the high speeds in case of any disturbance.

In particular, in such an application of the present energy-efficient actuator system for a flywheel energy storage, but also in other cases, an optimization control circuit 100, as referred to already several times and schematically shown in FIG. 13, is particularly advantageous. With such a control circuit 100 a control system is provided to control, determine and hold the respective optimum operating point, in particular with regard to the best energy efficiency. Accordingly, an optimum value, for example, with regard to energy consumption, is input in the control circuit 100 according to FIG. 13 via an input 101, and the variable to be optimized, e.g. the energy consumption, is supplied to a difference generator 104 via the connection 102 from a control path 103; an optimization controller 105 is connected to said difference generator to supply each the optimum set value to the difference generator 26 (see FIG. 3) mentioned at the beginning via the connection 15. As described, the controller 27 ascertains the necessary correcting variable, however, now in dependence on the variable to be optimized (e.g. energy consumption) and supplies it to the control path 103 which essentially comprises the combined energy adjuster 28, the energy converter 29 and the basic system 25 according to FIG. 3. All in all, this results in a cascaded control circuit 105-27.

With such an optimized control circuit 100 the time mean value of the energy consumption of the energy adjuster 28 may be brought to a minimum with a certain actual value, whereby in this manner the time mean value of the output value of the energy adjuster 28 takes on a certain value; the actual value to be aimed at in this manner is not constant right from the beginning and/or during operation and is not known directly, but rather may be dependent on different influence variables such as time, temperature and ageing.

This may be seen, for example, from the diagram according to FIG. 14, in which the necessary holding force F (in kN) versus the actual value Δs (in mm) is illustrated with two generalized holding characteristic lines L1 and L2, with corresponding, two operating points A1 and A2, respectively. In the static case, the necessary holding force F has a zero point at a position deviation Δs=0. By various influences, the operating point may shift from A1 to A2 and thus the holding characteristic line L1 to the characteristic line L2, for example, as a result of a temperature-dependent drift. With the help of the optimization control circuit 100 according to FIG. 13, by means of "optimum tracking", the controller finds the new operating point A2 (e.g. at Δs=0.5 mm) to again stabilize the rotor 86 etc. with a minimum energy.

FIG. 15 finally shows a flow diagram as an example for a control course, whereby after a start step 110 and an initialization step 111 the system initially enters into a waiting loop 112. As a result of a timer interrupt 113 a control cycle starts according to field 114. As a result, according to the field 115, actual values (see connection 13 in FIG. 3) are read in and supplied to the controller according to field 116, whereby the set value (according to connection 15 in FIG. 3) is also read in. After formation of the difference it is examined in a field 117 whether the command variable or control variable lies within or outside a predetermined interval which is determined in accordance with the energy-efficient actuator system at 118. If the control variable (or command variable) is within the interval, in accordance with a field 119 first of all the command variable of the high performance actuator 29' is set to zero (and thus the high performance actuator 29' is deactivated) and according to a field 120 the command variable for the energy-efficient actuator 29 is ascertained. Subsequently, the end of the control cycle is reached at 121, and the flow returns to waiting loop 112 according to field 122.

If, however, in the inquiry according to field 117 the control variable or command variable lies outside the given interval, then according to field 123 first of all the command variable or control variable of the high efficiency actuator 29 is set to the maximum or minimum value according to the given interval to control the energy-efficient actuator (energy converter 29) with this limited control variable. Subsequently, however, the high performance energy converter 29' is additionally controlled, after a control variable was defined for the high-performance energy converter 29' in accordance with field 124. Subsequently, the end 121 of the control cycle is reached again.

The invention claimed is:

1. A magnetic bearing actuator system comprising:
at least one electromagnetic actuator configured to generate forces to resist loads within a structure; and
at least one control system in communication with the at least one electromagnetic actuator, the at least one control system having at least two operating modes;
where at least one mode is a deactivatable high-power operating mode and at least one mode is a high-efficiency operating mode;
where the high-efficiency operating mode is activated during normal operation of the magnetic bearing actuator system; and
where the control system is configured to detect the loads within the structure and selectively activate the high-power operating mode to avoid impermissible displacement of the structure.

2. The magnetic bearing actuator system of claim 1, wherein an associated electromagnetic actuator is provided for each operating mode.

3. The magnetic bearing actuator system of claim 1, wherein at least one of the at least one electromagnetic actuator is a hybrid electromagnetic bearing.

4. The magnetic bearing actuator system of claim 1, wherein the at least one electromagnetic actuator supports an energy storage rotor.

5. The magnetic bearing actuator system of claim 1, wherein the at least one control system is configured to detect and maintain an optimum operating point of the system.

6. The magnetic bearing actuator system of claim 5, wherein the optimum operating point of the system is defined to maximize energy efficiency.

7. The magnetic bearing actuator system of claim 6, wherein the at least one control system comprises an optimization controller configured to adjust a value of a downstream controller, such that energy consumption of the at least one electromagnetic actuator or an energy adjuster thereof is minimized during use.

8. The magnetic bearing actuator system of claim 1, comprising at least one redundant electromagnetic actuator.

9. The magnetic bearing actuator system of claim 8, wherein the at least one redundant electromagnetic actuator is associated with the high-power operating mode.

10. The magnetic bearing actuator system of claim 1, wherein the at least two operating modes are defined by the at least one control system having at least one element in duplicate.

11. The magnetic bearing actuator system of claim 10, wherein each element of the at least one control system is provided in duplicate.

12. The magnetic bearing actuator system of claim 1, wherein the at least one control system is configured to detect an additional operating situation requiring activation of the high-power operating mode and to activate the high-power operating mode upon said detection.

13. The magnetic bearing actuator system of claim 1, comprising switching amplifier full bridges configured to drive the at least one electromagnetic actuator.

14. The magnetic bearing actuator system of claim 1, comprising at least one of hybrid amplifiers or purely analog amplifiers configured to control the at least one electromagnetic actuator.

15. The magnetic bearing actuator system of claim 1, wherein the at least one control system is configured to use at least one of an intermediate circuit voltage or an operating frequency of at least one of a digital controller or an analog-to-digital converter as a control parameter in the high-efficiency operating mode.

* * * * *